(12) United States Patent
Koyama et al.

(10) Patent No.: US 7,525,369 B2
(45) Date of Patent: Apr. 28, 2009

(54) SEMICONDUCTOR CIRCUIT APPARATUS WITH VOLTAGE BOOST

(75) Inventors: Tetsuhiro Koyama, Kanagawa (JP); Tetsuya Matsumoto, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 273 days.

(21) Appl. No.: 11/411,918

(22) Filed: Apr. 27, 2006

(65) Prior Publication Data

US 2006/0267670 A1 Nov. 30, 2006

(30) Foreign Application Priority Data

May 24, 2005 (JP) ............................. 2005-150710

(51) Int. Cl.
G05F 3/02 (2006.01)
(52) U.S. Cl. ...................... 327/536; 327/390
(58) Field of Classification Search .................. 326/88, 326/92; 327/390, 536; 363/59–60; 307/110
See application file for complete search history.

(56) References Cited

U.S. PATENT DOCUMENTS

| | | | | |
|---|---|---|---|---|
| 4,704,706 A | * | 11/1987 | Nakano et al. ............... 365/203 |
| 5,270,588 A | * | 12/1993 | Choi ............................ 326/88 |
| 5,381,051 A | * | 1/1995 | Morton ........................ 327/390 |
| 5,559,452 A | * | 9/1996 | Saito ............................ 326/88 |
| 5,852,552 A | * | 12/1998 | Kwon .......................... 363/60 |
| 5,875,133 A | * | 2/1999 | Miyashita et al. ........ 365/189.09 |
| 6,100,744 A | * | 8/2000 | Yoon et al. .................... 327/390 |
| 6,157,225 A | * | 12/2000 | Micheloni et al. ........... 327/112 |
| 6,271,715 B1 | * | 8/2001 | Pinchback et al. .......... 327/536 |
| 6,335,900 B1 | * | 1/2002 | Kwon et al. ............ 365/230.06 |
| 6,693,479 B1 | * | 2/2004 | Bardsley ....................... 327/390 |
| 2001/0003514 A1 | * | 6/2001 | Mizuno et al. ............... 365/233 |
| 2004/0228183 A1 | * | 11/2004 | Ito ............................... 365/200 |

FOREIGN PATENT DOCUMENTS

JP 2001-111397 4/2001

OTHER PUBLICATIONS

Wang, CMOS Digital Logic Circuits, website http://fourier.eng.hmc.edu/e84/lectures/ch4/node15.html.*

* cited by examiner

*Primary Examiner*—Donovan Lincoln
*Assistant Examiner*—Thomas J Hiltunen
(74) *Attorney, Agent, or Firm*—McGinn IP Law Group, PLLC

(57) ABSTRACT

A semiconductor circuit apparatus includes a booster which is connected to a single power supply and outputs a power supply voltage of the power supply or a voltage different from the power supply voltage, and a boost controller which controls whether to output the power supply voltage of the power supply or the voltage different from the power supply voltage.

8 Claims, 7 Drawing Sheets

SEMICONDUCTOR CIRCUIT APPARATUS WITH VOLTAGE BOOST

BACKGROUND OF THE INVENTION

1. Field of the Invention

The present invention generally relates to a semiconductor circuit apparatus having a converter for converting a power supply voltage and, particularly, to the operational control of the converter.

2. Description of Related Art

The recent semiconductor field has seen a decrease in power supply voltage as well as an increase in integration. Accordingly, an apparatus that operates with a low power supply voltage has been developed. Still, there are not a few apparatus that operate with a conventional power supply voltage, and it is often the case to combine apparatus with different power systems to configure a system. In this case, a booster that boosts a supply voltage may be used.

FIG. 8 shows the configuration of a booster of a related art (see Japanese Unexamined Patent Application Publication No. 2001-111397, for example). When an input signal Vφ is applied as a reference voltage $V_{ss}$, transistors N4 and N5 are conductive to apply a voltage $V_{dd}$ to a capacitor Cb, thereby charging the capacitor Cb. When the input signal Vφ turns a power supply voltage $V_{dd}$, a transistor P2 becomes conductive to apply a voltage of a sum of a switch terminal signal voltage $V_{in}$ and the power supply voltage $V_{dd}$ to the gates of switches (transistors) N0 and N1, so that the transistors N0 and N1 become conductive.

As described above, the booster of the related art always boosts the power supply voltage. It is thereby not compatible with the cases in need of selecting whether to boost a power supply voltage or not. The cases in need of such a selection involve a case that supplies a power supply voltage to a circuit during normal operation and supplies a boosted voltage from the power supply voltage to the circuit when a high-speed processing is needed. Those cases also involve a case that does not boost a voltage when the voltage of a power supply (e.g. charging battery) is sufficiently high and boosts the voltage when the voltage drops due to exhaust of the power supply or the like.

Those cases further involve a case that uses a single semiconductor apparatus with a plurality of different power supply voltages. If a semiconductor apparatus that includes a booster of a related art is designed on the assumption that a power supply voltage of 3.3V is supplied, it is unable to use the semiconductor apparatus with a power supply voltage of 5V. This is because the boosted voltage of a signal exceeds a withstand voltage of an operational circuit to cause the breakdown of the operational circuit. The above example is given by way of illustration only and is not to be construed to limit the scope of the invention.

SUMMARY OF THE INVENTION

According to an aspect of the present invention, there is provided a semiconductor circuit apparatus which includes a voltage converter connected to a single power supply, for outputting one selected from a power supply voltage of the power supply and a converted voltage converted from the power supply voltage, and a voltage conversion controller for controlling whether to output the power supply voltage or the converted voltage from the voltage converter.

The semiconductor circuit apparatus according to the present invention is compatible with both a power supply having a high power supply voltage and a power supply having a low power supply voltage. It thereby allows a large range of power supply voltage to be available. Further, the semiconductor circuit apparatus of the present invention enables the achievement of a booster which can be used at a high power supply voltage with a small number of devices. It thereby allows the switching operation to be performed with a large range of power supply voltage while suppressing an increase in the area.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
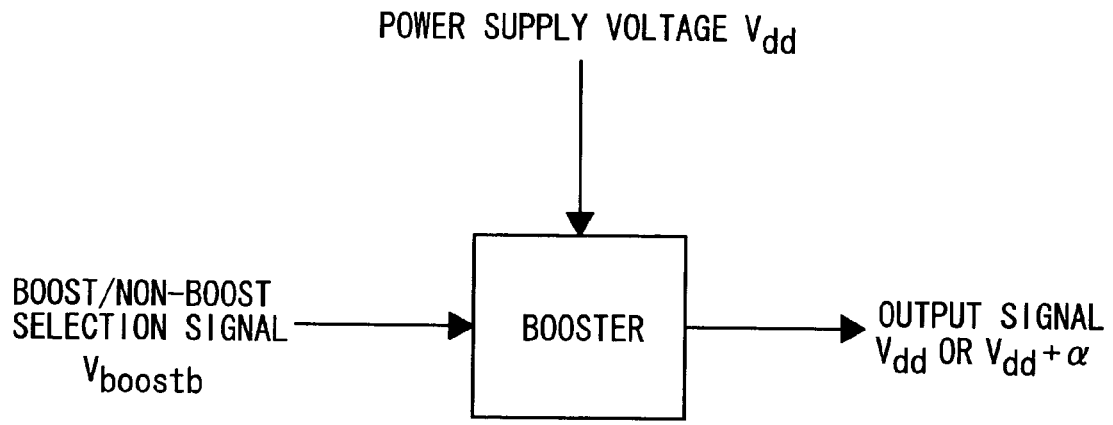
FIG. 1 is a pattern diagram showing a semiconductor circuit apparatus according to a first embodiment of the invention.

Embodiments of the present invention are described hereinafter in detail with reference to the drawings. FIG. 1 shows a pattern diagram of a semiconductor circuit apparatus according to a first embodiment of the invention. The semiconductor circuit apparatus of this embodiment has a booster to which a single power supply is connected and which selects one from a power supply voltage of the power supply and a converted voltage that is a higher than the power supply voltage according to a boost/non-boost selection signal $V_{boostb}$ and outputs the selected voltage. The single power supply means a pair of a power supply $V_{dd}$ on the high voltage side and a reference voltage $V_{ss}$.

The use of the circuit according to this embodiment enables the control of the operation of a voltage converter that converts a power supply voltage and the selection of one from the power supply voltage and a converted voltage as the output of the voltage converter. It is thereby possible to produce a semiconductor circuit apparatus that is capable of using a power supply with different power supply voltage levels and thus using a large range of power supply voltage. For example, there may be provided a semiconductor circuit which can operate with a high voltage source of 5V and also with a battery of 1.8V. A detailed circuit configuration is described herein.

Figure 2:
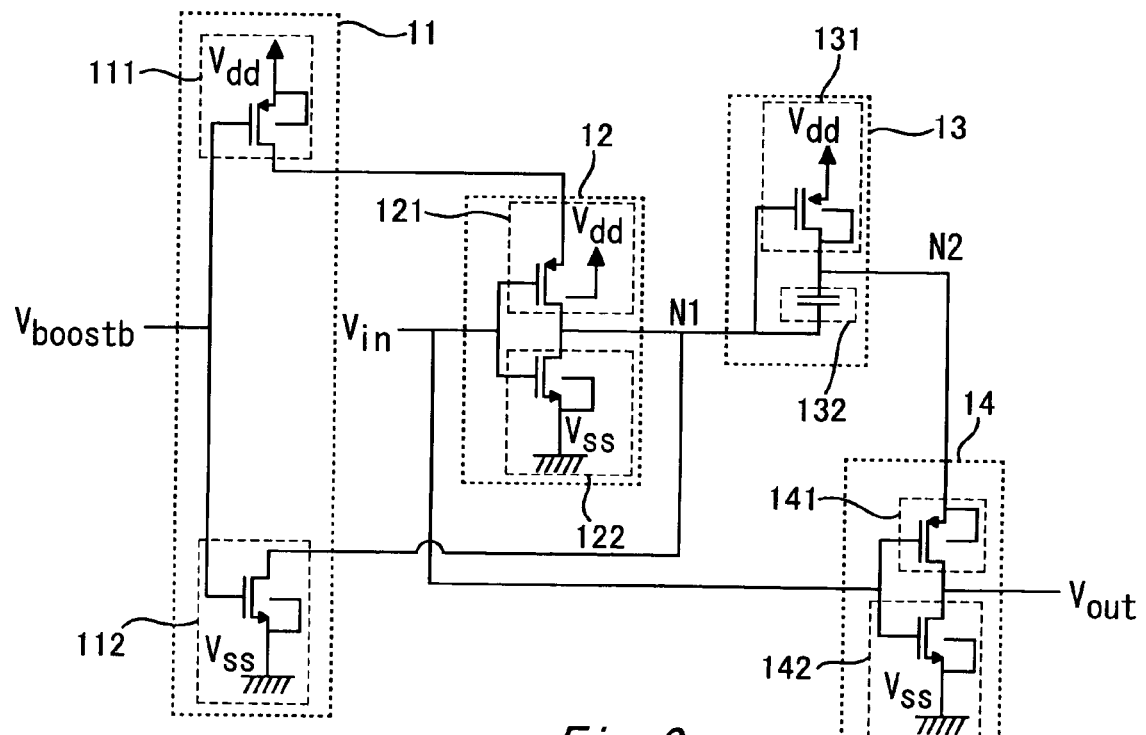
FIG. 2 is a view showing the configuration of the semiconductor circuit apparatus according to the first embodiment of the invention.

FIG. 2 shows the configuration of the semiconductor circuit apparatus 1 according to this embodiment. The semiconductor circuit apparatus 1 of this embodiment includes a boost controller 11, a signal inverter 12, a booster 13 which is an example of a voltage converter, and a signal output section 14.

The boost controller 11 controls the booster 13 to output either a power supply voltage of a power supply or a voltage different from the power supply voltage according to a boost/non-boost selection signal $V_{boostb}$. The signal inverter 12 inverts an input signal $V_{in}$ and outputs the inverted signal. The booster 13 is connected with a single power supply and outputs a power supply voltage of the power supply or a converted voltage that is higher than the power supply voltage. The signal output section 14 selects one from the signal output from the booster 13 and a reference voltage $V_{ss}$ and outputs the selected voltage.

The boost controller 11 in the semiconductor circuit apparatus 1 according to this embodiment controls the output to $V_{out}$ in either the boost mode where the converted voltage or the reference voltage $V_{ss}$ is output through $V_{out}$ or the normal mode where the power supply voltage $V_{dd}$ or the reference voltage $V_{ss}$ is output through $V_{out}$.

The boost controller 11 is composed of PMOS 111 and NMOS 112. A boost/non-boost selection signal $V_{boostb}$ is input to the gate of the PMOS 111 and the gate of the NMOS 112 in the boost controller 11. The above control is implemented in accordance with the boost/non-boost selection signal $V_{boostb}$.

The source of the PMOS 111 in the boost controller 11 is connected to the power supply voltage $V_{dd}$. The drain of the PMOS 111 in the boost controller 11 is connected to the source of the PMOS 121 in the signal inverter 12. The source of the NMOS 112 in the boost controller 11 is connected to the reference voltage $V_{ss}$. The drain of the NMOS 112 in the boost controller 11 is connected to the node N1.

The semiconductor circuit apparatus 1 according to this embodiment is in the boost mode when the boost/non-boost selection signal $V_{boostb}$ is at the reference voltage $V_{ss}$ and in the normal mode when the boost/non-boost selection signal $V_{boostb}$ is at the power supply voltage $V_{dd}$.

The signal inverter 12 for inverting and outputting the input signal $V_{in}$ is composed of PMOS 121 and NMOS 122. The input signal $V_{in}$ is input to the gate of the PMOS 121 and the gate of the NMOS 122 in the signal inverter 12.

The source of the PMOS 121 in the signal inverter 12 is connected to the boost controller 11. The source of the NMOS 122 in the signal inverter 12 is connected to the reference voltage $V_{ss}$. The drain of the PMOS 121 and the drain of the NMOS 122 in the signal inverter 12 are connected to each other and further connected to the node N1.

The booster 13 which is capable of outputting a higher voltage than the power supply voltage is composed of PMOS 131 and a capacitor 132. Since the booster 13 has the PMOS 131 and, the capacitor 132 the semiconductor circuit apparatus 1 according to this embodiment can prevent an increase in the area due to the capacitor.

The signal supplied through the node N1 is input to the gate of the PMOS 131 in the booster 13. The source of the PMOS 131 in the booster 13 is connected to the power supply voltage $V_{dd}$ and the drain is connected to the capacitor 132 in the booster 13 and the source of PMOS 141 in the signal output section 14. The signal supplied through the node N1 also input to the capacitor 132 in the booster 13.

The signal output section 14 is composed of PMOS 141 and NMOS 142. The input signal $V_{in}$ is input to the gate of the PMOS 141 and the gate of the NMOS 142 in the signal output section 14. The source of the PMOS 141 in the signal output section 14 is connected to the drain of the PMOS 131 in the booster 13 and also to the capacitor 132 in the booster 13. The source of the NMOS 142 in the signal output section 14 is connected to the reference voltage $V_{ss}$.

The drain of the PMOS 141 and the drain of the NMOS 142 in the signal output section 14 are connected to each other, and a signal is output to the $V_{out}$ through their connection.

Figure 3:
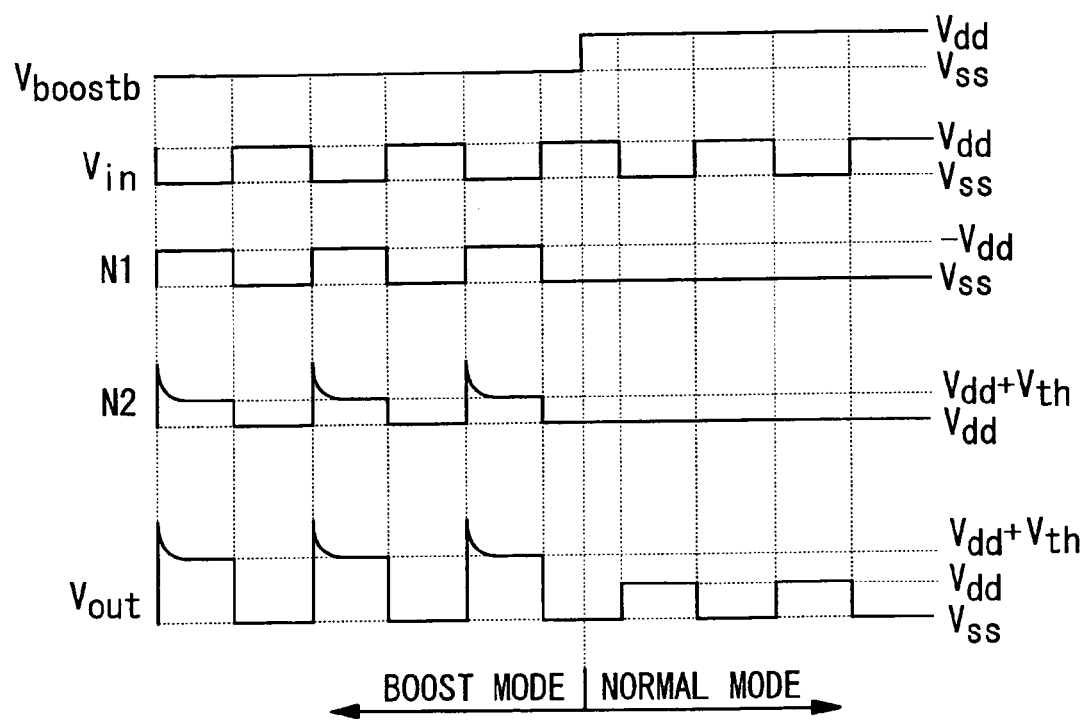
FIG. 3 is a timing chart under boost mode and normal mode.

The operation of the semiconductor circuit apparatus according to the present invention is described hereinafter. FIG. 3 shows the timing chart under the boost mode and the normal mode.

The case where the booster 13 performs the boost operation is described herein. In the boost mode, the voltage of the boost/non-boost selection signal $V_{boostb}$ is $V_{ss}$ and the PMOS 111 is ON and the NMOS 112 is OFF in the boost controller 11. If the voltage of the input signal $V_{in}$ is $V_{dd}$, the PMOS 121 is OFF and the NMOS 122 is ON in the signal inverter 12. The voltage at the node N1 is thereby $V_{ss}$.

Therefore, the PMOS 131 in the booster 13 is ON to apply the voltage $V_{dd}$ to the both ends of the capacitor 132, thereby charging the capacitor 132.

Since the input signal $V_{in}$ is $V_{dd}$, the PMOS 141 is OFF and the NMOS 142 is ON in the signal output section 14, so that the $V_{out}$ is $V_{ss}$.

When the voltage of the input signal $V_{in}$ turns $V_{ss}$, the PMOS 121 is ON and the NMOS 122 is OFF in the signal inverter 12. The voltage at the node N1 is thereby $V_{dd}$. The voltage at the node N2 when the voltage of the input signal $V_{in}$ changes from $V_{dd}$ to $V_{ss}$ is $2V_{dd}-V_{th}$, which is a sum of the voltage $V_{dd}$ at the node N1 and the voltage difference $V_{dd}$ at the capacitor 132. The voltage applied to the gate of the PMOS 131 in the booster 13 is equal to the voltage at the node N1, which is $V_{dd}$. The voltage $V_{th}$ is a threshold voltage of the PMOS 131 in the booster 13.

Thus, the voltage is applied to the drain of the PMOS 131 in the booster 13 is $2V_{dd}-V_{th}$ and the voltage applied to the gate of the PMOS 131 is $V_{dd}$, so that the PMOS 131 in the booster 13 remains ON. The capacitor 132 is thereby discharged. After that, when the voltage applied to the both ends of the capacitor 132 reaches $V_{th}$, the PMOS 131 turns OFF and the voltage at the node N2 becomes $V_{dd}+V_{th}$. In this way, a boosted voltage is generated as a result of the alternative input of $V_{dd}$ and $V_{ss}$ to the booster 13 and the alternative input of $V_{dd}$ and $V_{ss}$ to the terminal of the capacitor 132 on the opposite side from the power supply.

Further, since the input signal $V_{in}$ is $V_{ss}$, the PMOS 141 is ON and the NMOS 142 is OFF in the signal output section 14, and the voltage at the node N2 thereby equals the voltage at the $V_{out}$. Thus, the voltage at the $V_{out}$ drops drastically from $2V_{dd}-V_{th}$ to $V_{dd}+V_{th}$ and then stays at $V_{dd}+V_{th}$ after that.

The semiconductor circuit apparatus of this embodiment operates in the above-described manner during the boost mode where the converted voltage or the reference voltage $V_{ss}$ is output through the $V_{out}$. This mode occurs when the boost/non-boost selection signal $V_{boostb}$ is $V_{ss}$.

On the other hand, the normal mode where the booster 13 stops the boost operation is as follows. In the normal mode, the boost/non-boost selection signal $V_{boostb}$ turns $V_{dd}$. At this time, the PMOS 111 is OFF and the NMOS 112 is ON in the boost controller 11. Since the NMOS 112 in the boost controller 11 is ON, the voltage at the node N1 is fixed to $V_{ss}$.

The provision of a fixed voltage to the node N1 allows the capacitor 132 in the booster 13 to stop the boost operation. Since the voltage at the node N1 is $V_{ss}$, the PMOS 131 in the booster 13 is ON and a voltage difference of $V_{dd}$ is applied to the both ends of the capacitor 132. The capacitor 132 is thereby charged, so that the voltage at the node N2 is fixed to $V_{dd}$.

The input signal $V_{in}$ is used only for switching the PMOS 141 and the NMOS 142 in the signal output section 14. If the input signal $V_{in}$ is $V_{ss}$, the PMOS 141 is ON and the NMOS 142 is OFF in the signal output section 14 and thereby the voltage at the $V_{out}$ is $V_{dd}$. If, on the other hand, the input signal $V_{in}$ is $V_{dd}$, the PMOS 141 is OFF and the NMOS 142 is ON in the signal output section 14 and thereby the voltage at the $V_{out}$ is $V_{ss}$.

The semiconductor circuit apparatus of this embodiment operates in the above-described manner during the normal mode where the power supply voltage $V_{dd}$ or the reference voltage $V_{ss}$ is output through the $V_{out}$. This mode occurs when the boost/non-boost selection signal $V_{boostb}$ is $V_{dd}$.

Figure 4:
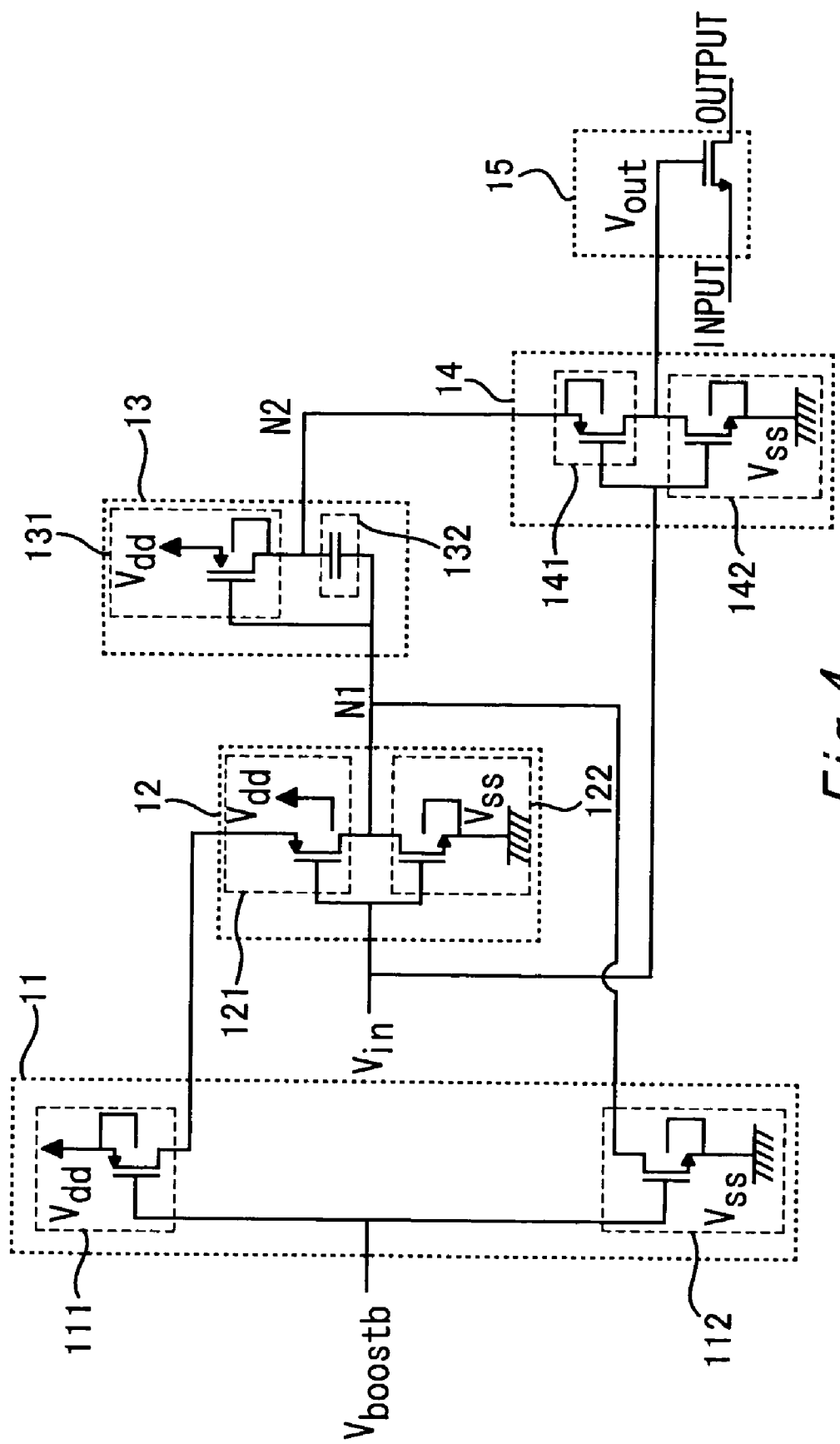
FIG. 4 is an example of the semiconductor circuit apparatus according to the first embodiment of the invention.

FIG. 4 shows an example which uses this embodiment. This example drives a switch 15 by using the voltage at the $V_{out}$ in the semiconductor circuit apparatus of this embodiment. The switch 15 is composed of a MOS transistor. The $V_{out}$ of the semiconductor circuit apparatus of this embodiment is connected to the gate of the MOS transistor.

In this example, the booster 13 is set to the boost mode, so that it is possible to use a high voltage by a boosted voltage even if the power supply voltage $V_{dd}$ is low. Therefore, even when the power supply voltage $V_{dd}$ is not high enough to drive the switch 15, the switch 15 can be driven by using a boosted signal. Thus, this example enables the use of the switch with a low power supply voltage $V_{dd}$.

Specifically, since the capacitor 132 in the booster 13 outputs a sum of the power supply voltage and the threshold voltage of the PMOS 131 in the booster 13 during the boost mode, it is possible to use the power supply voltage that subtracts the threshold voltage of the PMOS 131 in the booster 13 from the withstand voltage of the MOS transistor in the switch 15 as an upper limit. It is also possible to use the power supply voltage that subtracts the threshold voltage of the PMOS 131 in the booster 13 from the lower-limit voltage of the operational voltage of the MOS transistor in the switch 15 as a lower limit.

During the normal mode, it is possible to use the withstand voltage of the MOS transistor of the switch 15 as an upper limit and the lower-limit voltage of the operational voltage of the MOS transistor of the switch 15 as a lower limit. Accordingly, the use of the boost controller 11 which switches between the boost mode and the normal mode allows the upper limit to be the withstand voltage of the MOS transistor of the switch 15 and the lower limit to be the power supply voltage that subtracts the threshold voltage of the PMOS 131 in the booster 13 from the lower-limit voltage of the operational voltage of the MOS transistor of the switch 15.

Thus, this embodiment allows a lower limit of the range of the power supply voltage which can be used in the semiconductor circuit apparatus to be lower than the case of not using the booster and also allows a higher limit to be higher than the case of using the booster.

As described above, by using the boost controller 11 which switches between the boost mode and the normal mode, it is possible to produce a semiconductor circuit apparatus which is compatible with a larger range of power supply voltage compared with a semiconductor circuit apparatus which uses a conventional booster. Further, since the booster 13 is composed of one capacitor and PMOS, it is possible to produce a semiconductor circuit apparatus which has a smaller area compared with the apparatus using the conventional booster.

Second Embodiment

Figure 5:
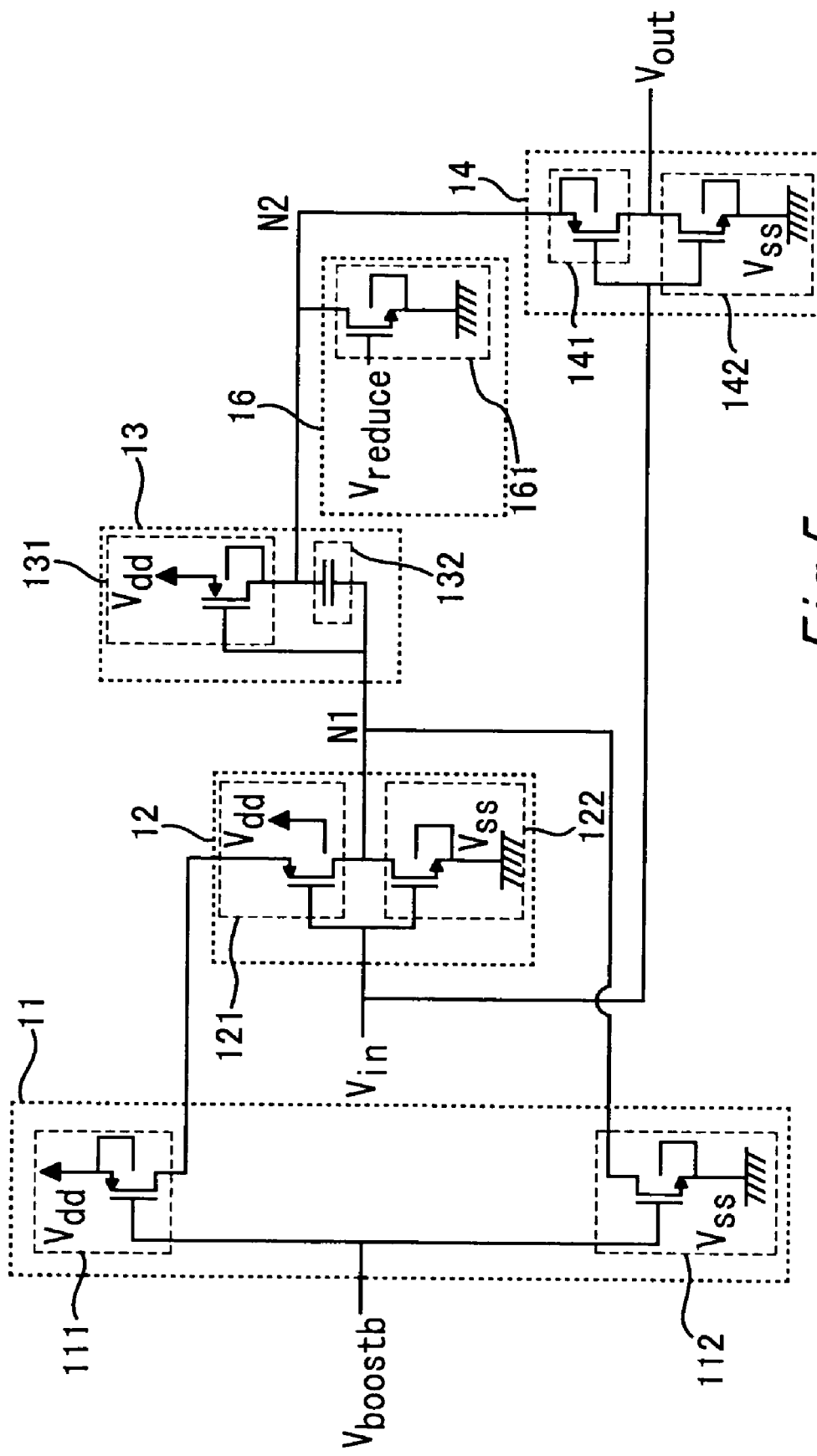
FIG. 5 is a view showing the configuration of a semiconductor circuit apparatus according to a second embodiment of the invention.

FIG. 5 is a view showing the configuration of a semiconductor circuit apparatus 2 according to a second embodiment of the invention. The semiconductor circuit apparatus 2 of this embodiment includes a boost controller 11, a signal inverter 12, a booster 13, a signal output section 14, and a step-down controller 16. The same elements and operational principle as in the first embodiments are not described in detail herein.

The semiconductor circuit apparatus 2 of this embodiment further includes the step-down controller 16 in addition to the elements in the semiconductor circuit apparatus 1 of the first embodiment. The step-down controller 16 is composed of NMOS 161. A reduction/non-reduction selection signal $V_{reduce}$ is input to the gate of the NMOS 161 in the step-down controller 16. Also in the step-down controller 16, the source of the NMOS 161 is connected to the reference voltage $V_{ss}$, and the drain of the NMOS 161 is connected to the node N2, the drain of the PMOS 131 and the capacitor 132 in the booster 13.

Figure 6:
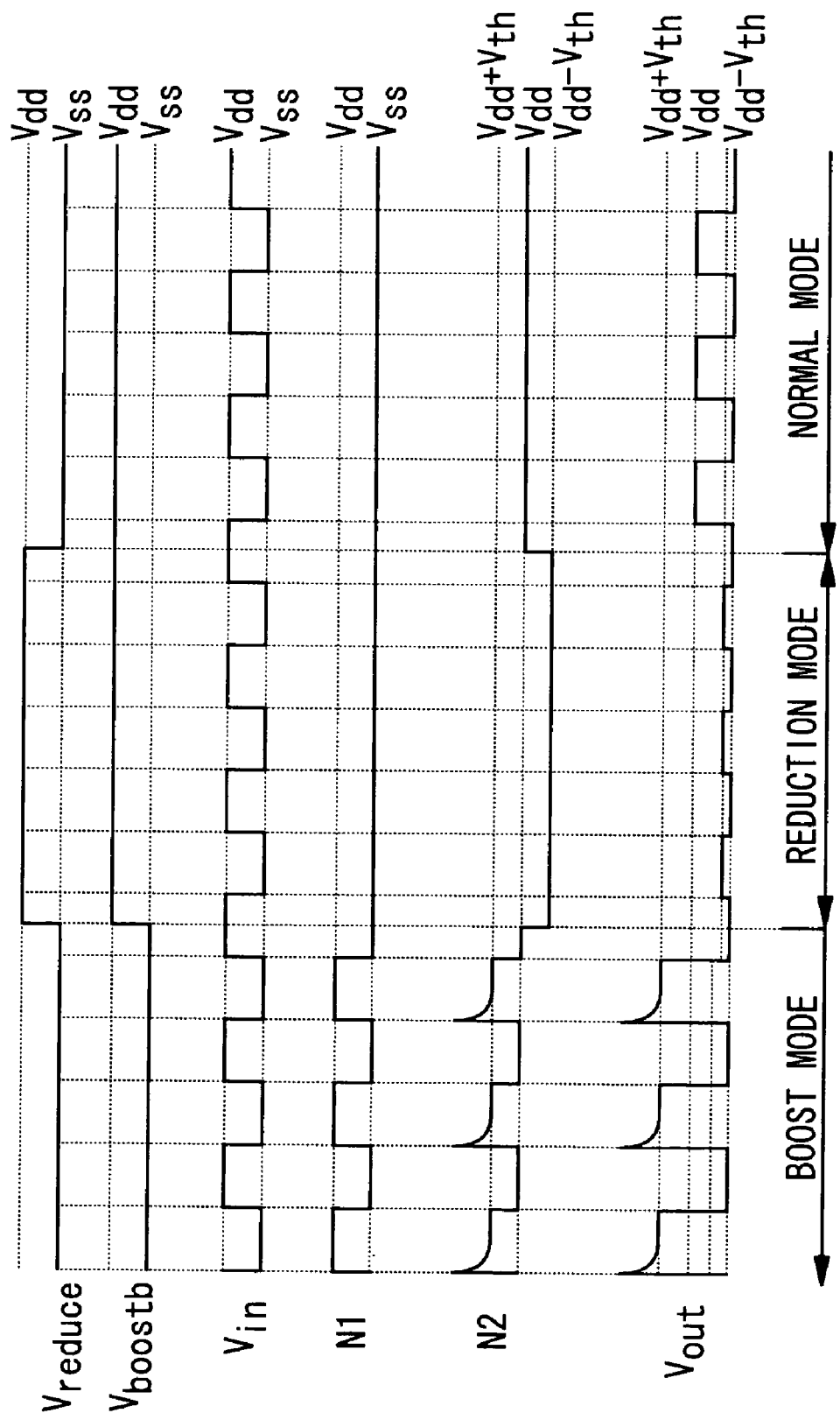
FIG. 6 is a timing chart showing the operation under the conditions shifting from boost mode through step-down mode to normal mode.

The operation in the semiconductor circuit apparatus of this embodiment is described herein. FIG. 6 is a timing chart where the semiconductor circuit apparatus operates in the boost mode, then in the step-down mode and finally in the normal mode. In this embodiment, the boost mode occurs when the boost/non-boost selection signal $V_{boostb}$ is $V_{ss}$ and the reduction/non-reduction selection signal $V_{reduce}$ is also $V_{ss}$. The normal mode occurs when the boost/non-boost selection signal $V_{boostb}$ is $V_{dd}$ and the reduction/non-reduction selection signal $V_{reduce}$ is $V_{ss}$. The step-down mode occurs when the boost/non-boost selection signal $V_{boostb}$ is $V_{dd}$ and the reduction/non-reduction selection signal $V_{reduce}$ is $V_{dd}$.

The operations in the boost mode and the normal mode are the same as in the first embodiment and thus not described herein. In the step-down mode, the boost/non-boost selection signal $V_{boostb}$ is $V_{dd}$ and the reduction/non-reduction selection signal $V_{reduce}$ is also $V_{dd}$, and the voltage at the node N1 is thereby $V_{ss}$. The PMOS 131 in the booster 13 is thus ON.

Further, since the signal $V_{reduce}$ is $V_{dd}$ in the step-down mode, the NMOS 161 in the step-down controller 16 is ON and therefore the PMOS 131 in the booster 13 and the NMOS 161 in the step-down controller 16 are conductive. A current therefore flows from the PMOS 131 in the booster 13 to the NMOS 161 in the step-down controller 16.

The current flows from the source of the PMOS 131 in the booster 13 which is connected to VDD through a sub-substrate of the PMOS 131 to the node N2. Since the source and the sub-substrate of the PMOS 131 in the booster 13 are connected across a PN junction, the voltage drops by the amount corresponding to the voltage $V_{th}$ which occurs due to the PN junction. Thus, the voltage at the node N2 is $V_{dd}-V_{th}$.

The input signal $V_{in}$ is used only for switching the PMOS 141 and the NMOS 142 in the signal output section 14. If the input signal $V_{in}$ is $V_{ss}$, the PMOS 141 is ON and the NMOS 142 is OFF in the signal output section 14 and thereby the voltage at the $V_{out}$ is $V_{dd}-V_{th}$. If, on the other hand, the input signal $V_{in}$ is $V_{dd}$, the PMOS 141 is OFF and the NMOS 142 is ON in the signal output section 14 and thereby the voltage at the $V_{out}$ is $V_{ss}$.

As described above, the use of the boost controller 11 which switches between the normal mode, the boost mode and the step-down mode enables the switch operation at a larger range of power supply voltage than in the first embodiment.

Third Embodiment

Figure 7:
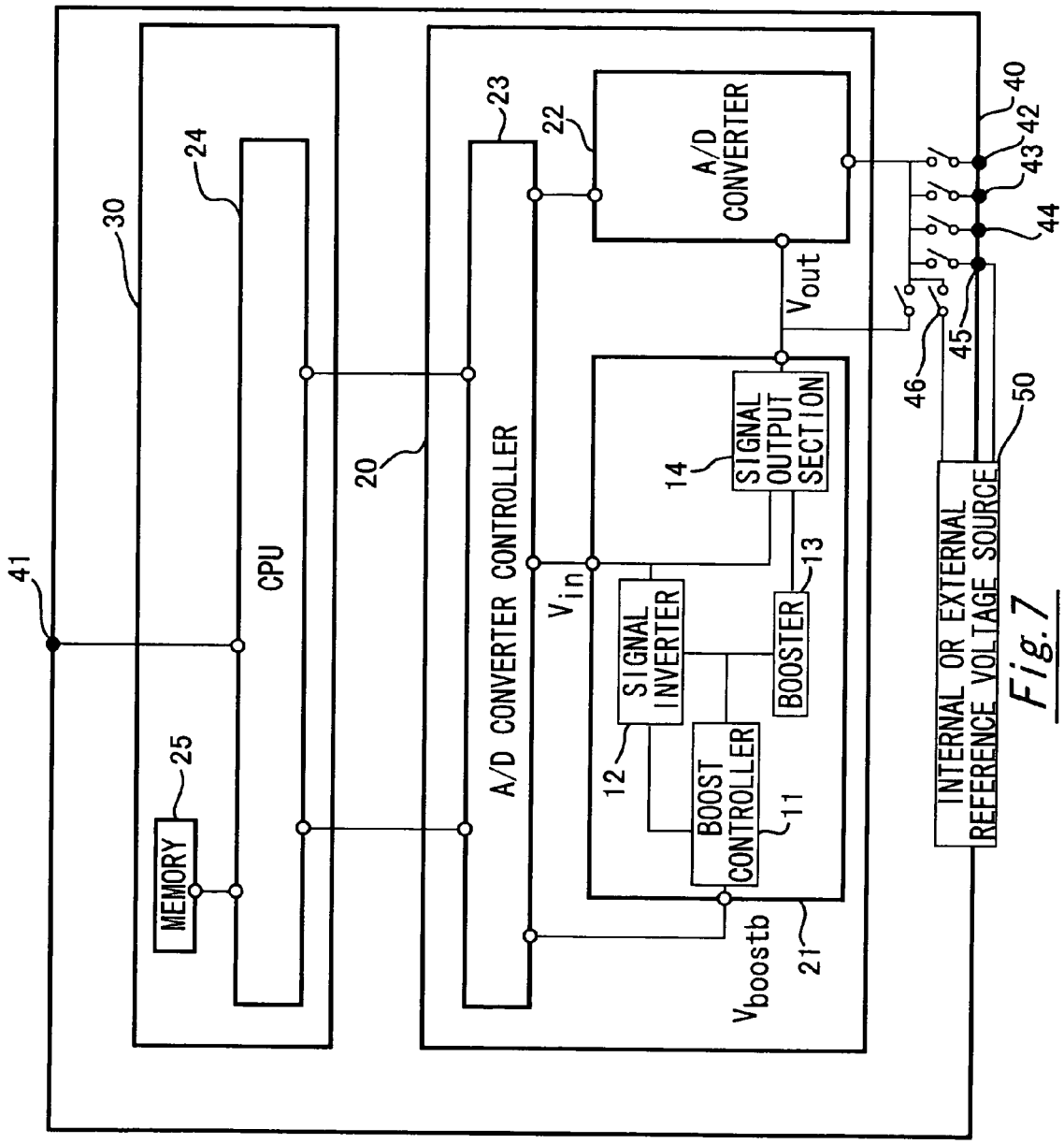
FIG. 7 is a block diagram showing a voltage conversion signal processing unit according to a third embodiment of the invention.
Figure 8:
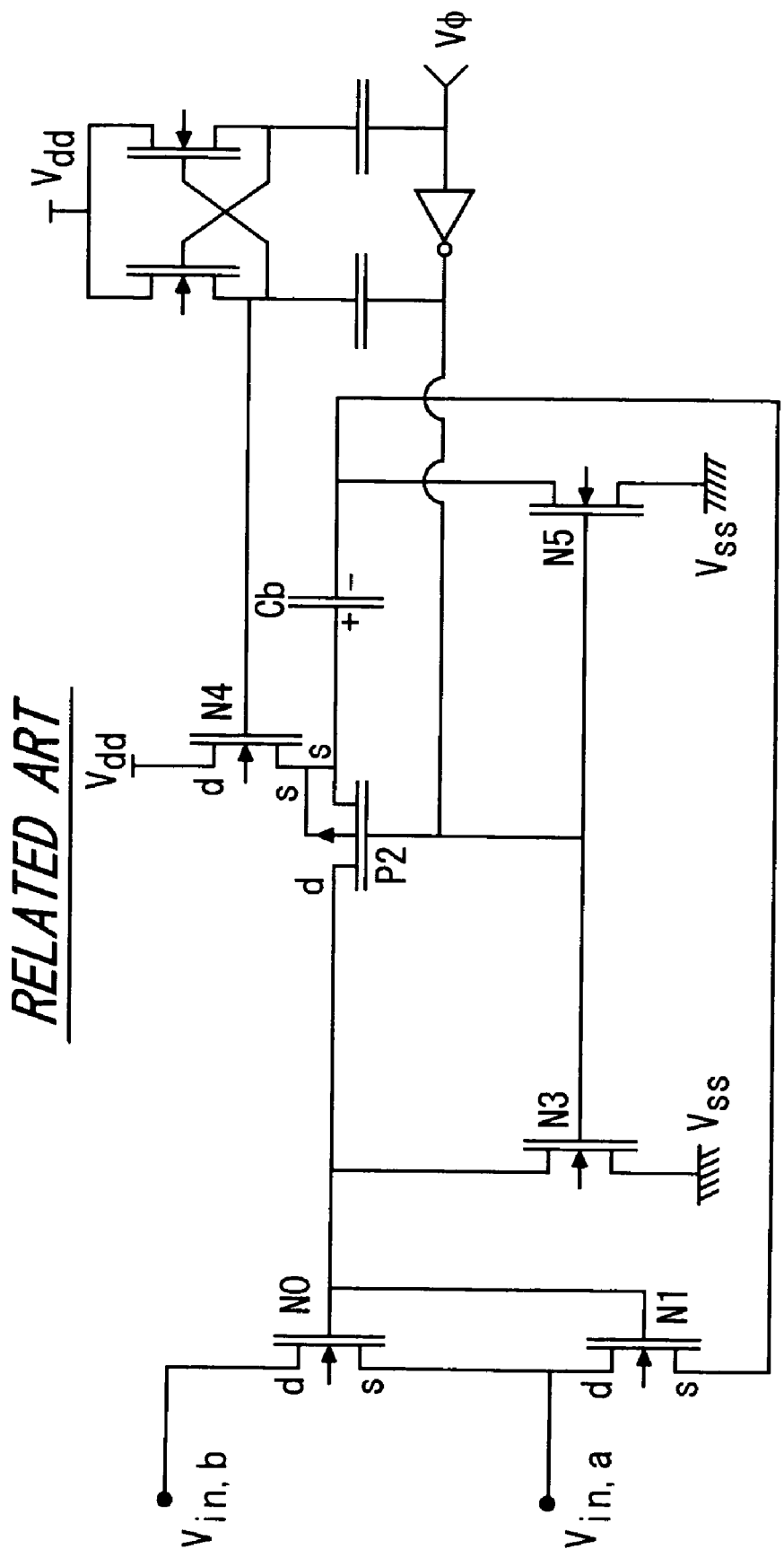
FIG. 8 is a pattern diagram showing a booster of a related art.

A third embodiment applies the present invention to a voltage conversion signal processing unit as another aspect. FIG. 7 is a block diagram showing a voltage conversion signal processing unit according to this embodiment. The same elements and operational principle as in the first embodiments are not described in detail herein.

This embodiment uses the semiconductor circuit apparatus of the first embodiment as an amplitude converter 21. A boost/non-boost selection signal $V_{boostb}$ which serves as a control signal of the amplitude converter 21 controls whether a CPU 24 in a control apparatus 30 boosts a signal or not. A voltage conversion apparatus 20 and the control apparatus 30 are placed to generate the boost/non-boost selection signal $V_{boostb}$ as a control signal of the amplitude converter 21.

The voltage conversion apparatus 20 includes the amplitude converter 21, an A/D converter 22, and an A/D converter controller 23. The A/D converter controller 23 generates a signal $V_{boostb}$ from an A/D control signal. The control apparatus 30 includes the CPU 24 and a memory 25. A voltage conversion signal processing unit 40 includes the voltage conversion apparatus 20, the control apparatus 30 and a plurality of terminals. A reference voltage source 50 is placed inside or outside of the voltage conversion signal processing unit 40.

As a first method to generate the boost/non-boost selection signal $V_{boostb}$ in the CPU, the CPU 24 determines whether to boost the signal according to a signal from the memory 25. In this method, information about whether to boost the signal by the amplitude converter 21 is stored before shipment. Based on the information, the CPU 24 supplies an A/D converter control signal to the A/D converter controller 23. Then, the A/D converter controller 23 supplies the boost/non-boost control signal $V_{boostb}$ to the boost controller 11 in the amplitude converter 21.

As a second method, a $V_{boostb}$ control terminal 41 is placed outside of the voltage conversion signal processing unit 40, and a user controls the $V_{boostb}$ control terminal 41, so that the CPU thereby determines whether to boost the signal. A control signal from the user is transmitted to the CPU 24 and, based on the control signal, the CPU 24 supplies an A/D converter control signal to the A/D converter controller 23. Then, the A/D converter controller 23 supplies the boost/non-boost control signal $V_{boostb}$ to the boost controller 11 in the amplitude converter 21.

As a third method, the A/D converter 22 converts the signals output from a first A/D conversion analog signal terminal 42, a second A/D conversion analog signal terminal 43, a power supply voltage terminal 44, an external reference voltage source input terminal 45, an internal reference input terminal 46, and $V_{out}$ output from the amplitude converter 21.

The conversion results are supplied as A/D conversion results to the CPU 24 through the A/D converter controller 23. Based on the A/D conversion results, the CPU 24 compares an output voltage of the reference voltage source 50 with the power supply voltage to determine whether to boost the signal by the amplitude converter 21 and generates an A/D converter control signal.

After that, the CPU 24 transmits the A/D converter control signal to the A/D converter controller 23 so that the A/D converter controller 23 supplies the boost/non-boost control signal $V_{boostb}$ to the boost controller 11 in the amplitude converter 21.

It is thereby possible to control the amplitude converter 21 to boost the signal or not according to need.

It is apparent that the present invention is not limited to the above embodiment that may be modified and changed without departing from the scope and spirit of the invention.

What is claimed is:

1. A semiconductor circuit apparatus, comprising:
   a voltage converter connected to a single power supply, for outputting one selected from a power supply voltage of the power supply and a converted voltage converted from the power supply voltage;
   a voltage conversion controller for controlling whether to output the power supply voltage or the converted voltage from the voltage converter;
   a signal output section connected to the voltage converter, for selecting and outputting a signal output from the voltage converter and a reference voltage in accordance with an input signal; and
   a step-down section for stepping down a voltage output from the voltage converter, wherein whether to perform voltage step-down operation in the step-down section is controlled in accordance with a reduction/non-reduction selection signal,
   wherein:
      the voltage converter generates the converted voltage by using a reference voltage and the power supply voltage that are input alternatively,
      the voltage conversion controller controls the voltage converter to output the power supply voltage by supplying a fixed voltage to the voltage converter, and
      when outputting the converted voltage, the voltage converter stores a voltage while the signal output section outputs the reference voltage and supplies the converted voltage to the signal output section while the signal output section outputs the converted voltage.

2. The semiconductor circuit apparatus according to claim 1, wherein the voltage converter includes a capacitor for accumulating a charge corresponding to a difference between the power supply voltage and a voltage different from the power supply voltage.

3. The semiconductor circuit apparatus according to claim 1, further comprising:
   a signal inverter for inverting the input signal and outputting the reference voltage and the power supply voltage alternatively to the voltage converter,
   wherein the voltage converter generates the converted voltage by using the reference voltage and the power supply voltage that are input alternatively.

4. The semiconductor circuit apparatus according to claim 1, wherein the voltage conversion controller controls the voltage converter in accordance with a boost/non-boost selection signal input through an external terminal.

5. The semiconductor circuit apparatus according to claim 1, further comprising:
   a storage medium for storing an input boost/non-boost selection signal,
   wherein the voltage conversion controller controls the voltage converter in accordance with the boost/non-boost selection signal.

6. The semiconductor circuit apparatus according to claim 1, further comprising:
   a comparator for comparing an input voltage with a signal output from the voltage converter or the power supply voltage, wherein a boost/non-boost selection signal is generated based on a result of the comparison and supplied to the voltage converter controller, and the voltage conversion controller controls the voltage converter in accordance with the boost/non-boost selection signal.

7. A semiconductor circuit apparatus, comprising:

an input signal inverter, comprising a first PMOS transistor serially interconnected to a first NMOS transistor, receiving an input signal at gates of said first PMOS and NMOS transistors and inverting said input signal as an output thereof;

a boost controller, comprising a second PMOS transistor and a second NMOS transistor, receiving a boost control signal at gates of said second PMOS and NMOS transistors, a drain of said second PMOS transistor being connected to a source of said first PMOS transistor and a drain of said second NMOS transistor being connected to the output of said input signal inverter;

a voltage converter, comprising a third PMOS transistor serially connected to a capacitor, a source of said third PMOS connected to a power supply, a gate of said third PMOS transistor and one electrode of said capacitor being connected to the output of the input signal inverter; and a signal output section receiving said input signal as an input control signal, said signal output section connected to said voltage converter such that said output section provides an output signal according to said input signal and said boost control signal.

8. The semiconductor circuit apparatus of claim 7, further comprising:

a step-down controller, receiving a step-down control signal, connected to said signal output section such that said output section provides said output signal according to said input signal, said boost control signal, and said step-down control signal.

* * * * *